United States Patent [19]

Gozani et al.

[11] Patent Number: 5,153,439

[45] Date of Patent: Oct. 6, 1992

[54] MULTI-SENSOR EXPLOSIVE DETECTION SYSTEM USING AN ARTICIFICAL NEURAL SYSTEM

[75] Inventors: Tsahi Gozani, Palo Alto; Patrick M. Shea, Sunnyvale, both of Calif.

[73] Assignee: Science Applications International Corporation, San Diego, Calif.

[21] Appl. No.: 784,156

[22] Filed: Oct. 28, 1991

Related U.S. Application Data

[60] Division of Ser. No. 463,036, Jan. 16, 1990, Pat. No. 5,078,952, which is a continuation-in-part of Ser. No. 367,534, Jun. 16, 1989, abandoned, which is a continuation-in-part of Ser. No. 321,511, Mar. 9, 1989, Pat. No. 5,006,299, which is a continuation-in-part of Ser. No. 53,950, May 28, 1987, abandoned.

[51] Int. Cl.$^5$ .............. G01N 23/222; G06F 15/52; G06F 15/18; G05B 13/00
[52] U.S. Cl. .............. 250/390.04; 376/159; 395/22
[58] Field of Search .......... 376/159; 395/22; 250/390.04

[56] References Cited

U.S. PATENT DOCUMENTS

| | | | |
|---|---|---|---|
| 3,018,374 | 1/1962 | Prichett | 376/159 |
| 3,124,679 | 3/1964 | Tittman et al. | 250/380 |
| 3,146,349 | 8/1964 | Jordan | 376/160 |
| 3,237,765 | 3/1966 | Gaudin et al. | 209/589 |
| 3,728,544 | 4/1973 | Untemyer | 376/159 |
| 3,767,919 | 10/1973 | Michaelis | 376/159 |
| 3,788,256 | 1/1974 | Untemyer | 376/159 |
| 3,808,444 | 4/1974 | Schneeberger et al. | 378/57 |
| 3,832,545 | 8/1974 | Bartko | 376/159 |
| 3,997,787 | 12/1976 | Fearon et al. | 250/359.1 |
| 4,229,654 | 10/1980 | Arya et al. | 250/358.1 |
| 4,251,726 | 2/1981 | Alvarez | 376/159 |
| 4,266,132 | 5/1981 | Marshall, III | 250/359.1 |
| 4,278,885 | 7/1981 | von Alfthan et al. | 250/370.01 |
| 4,291,227 | 9/1981 | Caldwell et al. | 250/328 |
| 4,320,298 | 3/1982 | Buford, Jr. et al. | 250/358.1 |
| 4,672,651 | 6/1987 | Horiba et al. | 378/62 |
| 4,756,866 | 7/1988 | Alvarez | 376/157 |
| 4,851,687 | 7/1989 | Ettinger et al. | 250/390.04 |
| 4,882,121 | 11/1989 | Grenier | 376/159 |
| 5,078,952 | 1/1992 | Gozani et al. | 376/159 |

OTHER PUBLICATIONS

*Nuclear Instrumentation*, Section 1.5, pp. 4–18 (McGraw-Hill Series in Nuclear Engineering).

"Neutron Radiology Takes X-Ray Pictures-with a Difference," Product Engineering, vol. 42, No. 12, pp. 38–39 (Jul. 1971).

Knoll, G. F., *Radiation Detection and Measurement*, (John Wiley and Sons, 1979).

Gozani, *Active Nondestructive Assay of Nuclear Materials*, United States Nuclear Regulatory Commission, NUREG-CR-0602, SAI-FM-2585 (1981).

Smith, et al., "Application of a 14 MeV Neutron Source to the Detection of Special Nuclear Material Diversion," *IEEE Transactions on Nuclear Science*, vol. NS-28, No. 2, p. 1637 (Apr. 1981).

Gozani, et al., "Nuclear-Based Techniques for Explosive Detection," *Journal of Energetic Materials*, vol. 4, pp. 377–414 (1986).

Drndarevic, et al., "A Signal Process For High Counting Rate Gamma Ray Spectroscopy with NaI(Tl) Detectors," *IEEE Proceedings of Nuclear Science* (Feb. 1988).

*Primary Examiner*—Constantine Hannaher
*Attorney, Agent, or Firm*—Fitch, Even, Tabin & Flannery

[57] ABSTRACT

A nuclear detection system and method uses an artificial neural system to efficiently detect explosives in checked airline baggage or other parcels with a high probability of detection (PD) and a low probability of false alarms (PFA). The detection system detects the presence of nitrogen and other elements and their rough density distribution within the object under investigation by performing a nuclear-based analysis of the object. The detection system includes a source of neutrons; an array of gamma ray detectors; at least one neutron detector; means for irradiating the object being examined with neutrons from the neutron source, which neutrons interact with the atomic nuclei of one or more specific elements, e.g., nitrogen, chlorine, or hydrogen present within the object so as to cause elemental-specific gamma rays to be emitted; means for capturing and counting the elemental-specific gamma rays and determining their approximate origin within the object, thereby providing a rough measure of the density distribution of these specific elements within the object; and means for detecting neutrons that pass through the object without substantially interacting with atomic nuclei, thereby providing an image of the density distribution of elements in the object. The invention further includes an X-radiography system for generating a high-resolution two-dimensional density image of the object. An artificial neural system (ANS) provides an efficient means for analyzing the recorded gamma rays, image, and other data so as to accurately discriminate between objects carrying explosives and objects not carrying explosives.

15 Claims, 6 Drawing Sheets

MULTI-SENSOR EXPLOSIVE DETECTION SYSTEM USING AN ARTIFICAL NEURAL SYSTEM

Related Applications

This application is a divisional of U.S. application Ser. No. 07/463,036, filed 1/10/90; which is a continuation-in-part of U.S. application Ser. No. 7/367,534, filed 06/16/89, now abandoned; which is a continuation-in-part of U.S. application Ser. No. 7/321,511, filed 03/09/91, now U.S. Pat. No. 5,006,299; which is a continuation-in-part of application

BACKGROUND OF THE INVENTION

The present invention relates to an explosive detection system used to detect explosives in checked airline baggage. More specifically, the present invention relates to a nuclear-based explosive detection system that accurately discriminates between parcels with and without explosives. The system includes, in addition to a neutron source and an array of gamma ray detectors, at least one neutron detector, means for removing background noise from the ensuing gamma ray spectrum, an X-ray system, and/or an artificial neural system (ANS).

A great need exists for the scanning of luggage, baggage and other parcels for the detection of any explosive material contained or concealed within their confines. For example, a large number of pieces of luggage (estimated at over 2,000,000) are checked and/or carried onto aircraft daily by close to seven hundred and fifty thousand (750,000) passengers within six hundred (600) airports extending across the country. Many more packages move through the mails or are shipped to sensitive buildings. There is a possibility, albeit small, that any one piece of luggage or parcel might contain explosive material. It is, therefore, desirable to protect the public by providing detection systems to scan the luggage and parcels to detect the presence of any explosive material.

It thereby follows that any system of checking luggage or parcels must have a very high probability of detection (PD) in order to be effective. Because of the large number of parcels processed, a high throughput is necessary for practicality. In addition, any detection system, because of the large number of scanned items, is bound to occasionally give a false alarm. The probability of these false alarms (PFA) must be minimized in order to provide for an effective explosive detection system. This is because when an alarm occurs it is not known, at that time, whether it is true or false. This means that each time an alarm occurs, a passenger or parcel must be detained for further investigation. If false alarms are significantly high the nuisance level and the delays could be unacceptable to the public. It is, therefore, important that any explosive detection system must have a very high probability of detection (high PD), a high throughput rate, and yet at the same time have a very low probability of false alarms (low PFA). These conflicting criteria have hampered efforts in the past to build a reliable and usable system.

In general, prior art systems have not met the desired characteristics of having a high probability of detection (PD) with a low probability of false alarms (PFA) at acceptable throughput rates. As an example, one such prior art system is shown in U.S. Pat. No. 3,832,545. This patent provides for a system for the detection of nitrogen, which is generally present in the explosive materials to be detected. As described in the referenced patent, a rough two-dimensional profile of the nitrogen content within the object being inspected is provided. This profile is then used in an attempt to determine whether explosive materials are present. Unfortunately, however, because of the types of detectors used by the invention described in the '545 patent (liquid or plastic scintillators), the processing of the detector signals is quite inefficient. Moreover, the two-dimensional limitation allows many materials to be positioned in the object being examined so as to defy detection, thereby providing an unacceptably low PD and high PFA.

Other types of prior art explosive detection systems depend upon the prior seeding of explosive materials with a tracer material, such as a radioactive tracer. Although this type of system could be very useful if all explosive material were manufactured with such tracer material, because of the large amount of explosive material which has already been manufactured and because of the difficulty of controlling the manufacture of all explosive material so as to contain such tracer material, this type of system is not practical. A useable system must be able to detect the presence of explosive material of a conventional type and of an unconventional type, whether disposed within an object either in its original manufactured form, or if deployed within the object so as to attempt to confuse or evade the detection system. The prior art systems have not met these various criteria and cannot produce the desired high probability of detection with the relatively low production of false alarms.

An acceptable response to the explosive threat to aviation, mails, or shipping requires detection techniques that are highly sensitive, specific, rapid and non-intrusive. The efficient detection of nitrogen, at this point, offers the best overall solution, although other elements, such as hydrogen and chlorine, could also be detected. It is, therefore, important that the detection of nitrogen be provided to give the maximum information of the physical parameters of the explosive, such as density and spatial distribution. The use of nuclear based techniques which subject the luggage or parcels to thermal neutrons can be the basis of a system to produce the desired results, but this system cannot be based on the prior art techniques. It is important that the intensity, energy and spatial distribution of the detected radiations from the object under observation be provided in a way to help determine the presence or absence of explosives, and this has not yet been accomplished.

In addition to high detection sensitivity and low false alarm, the detection of the explosive should be independent of the specific configuration and must be non-intrusive in order to protect privacy. The detection equipment, of course, must be non-hazardous to the contents of the checked items and to the operating personnel and environment. Other more general criteria are that the system must be reliable, easily maintained and operable by relatively unskilled personnel and that the cost must be low enough so as to be non-burdensome to airlines and airports. Finally, it is desirable, when all other requirements are achieved, that the size of the system be relatively small so that the system may be useful in a wide variety of environments.

In addition to the nuclear based systems described above, non-nuclear systems have also been investigated. These systems have occasionally achieved relatively high efficiencies of detection for some types of explosives, but generally have relatively high false alarm rates and have long screening times. These type of non-nuclear systems, therefore, by themselves cannot achieve the desired results. However, some features of such non-nuclear systems may advantageously be combined with a nuclear system as described herein, to significantly improve the overall detection capabilities of the system.

In order to develop a proper explosive detection system, an understanding is required of the properties of the various explosives relevant to the specific techniques to be used. Although there are a large number of explosive types, a general classification into six major groups with minor variations, has been proposed. The proposed classification scheme includes the following types of explosives: (1) nitroglycerine based dynamites, (2) ammonium nitrate based dynamites, (3) military explosives, (4) homemade explosives, (5) low order powders, and (6) special purpose explosives.

In general, all of these explosive types contain a relatively high amount of nitrogen ranging from nine to thirty five percent by weight. The nominal density of these explosives is typically 1.6 g/cm$^3$, with ranges between 1 to 2 g/cm$^3$ or more. These physical properties demonstrate that the most unique signature of explosives is the high concentration and density of the nitrogen content. Also the presence of other elements in combination with the presence of nitrogen can be considered. Physical factors may also help identify explosives. One physical factor, for example, is a minimum propagation thickness or diameter in order for most explosives to be effective. This minimum propagation thickness requires a sizeable contiguous body of explosives in the other two dimensions. This information is useful to the detection of explosives without making a specific assumption of the actual shape of the explosive.

It can be seen, therefore, that a nuclear detection technique can provide for the detection of the nitrogen content, which can provide an indication as to the presence of an explosive. However, the frequent occurrence of nitrogen in non-explosive materials limits the level of detection sensitivity and merely detecting the presence of absence of nitrogen alone is generally not sufficient. Therefore, additional information is required beyond simply sensing the presence of the nitrogen. The present invention provides for this additional information.

SUMMARY OF THE PRESENT INVENTION

The present invention provides a nuclear-based detection system and method that efficiently detects explosives in checked airline baggage or other parcels with a high probability of detection (PD) and a low probability of false alarms (PFA). The detection system advantageously combines several detection criteria to improve the speed and performance with which the detection system is able to discriminate between objects (parcels, suitcases, packages, etc.) with explosives and objects without explosives.

The first and foremost criteria used by the present invention to detect explosives is to ascertain a high content and concentration of nitrogen in the object under examination. The content and concentration of other elements in combination with nitrogen is also selectively used. To this end, the present invention uses thermal neutron activation (TNA) to immerse the object in a bath of thermal neutrons, which neutrons interact with the atomic nuclei causing prompt gamma rays to be emitted. If nitrogen is present, the gamma rays have a unique energy (10.8 MeV). If other prescribed elements are present, such as hydrogen and chlorine, the gamma rays have other known energies. The presence of such nitrogen-specific (or other element-specific or combinations of element-specific) gamma rays thus comprises one "signature" of an explosive. A main function of the present invention is thus to detect such nitrogen-specific (or other element-specific) gamma rays.

In order to achieve the highest possible sensitivity to nitrogen, the detection scheme employed by the invention provides the highest possible count-rate of gamma rays due to nitrogen with as low a background (of gamma rays not due to nitrogen) as possible. This is accomplished by bathing the object under examination in thermal neutrons and utilizing a properly designed detector array that surrounds the object as it is submersed in the thermal neutron bath, and appropriate signal processing techniques to perform the gamma ray counts. The 10.8 Mev gamma ray count-rate from each detector within the array is then combined with a suitable reconstruction algorithm to yield a rough two and/or three-dimensional image of the nitrogen bearing material within the object. This rough image helps identify explosives because it provides a coarse measure of the distribution and level of nitrogen density. (This density measure is inherently coarse due to the practical sizes of the gamma detectors.) The invention described in applicant's first application, Ser. No. 07/053,950, was the first known disclosure of a TNA based system that advantageously provided both a high nitrogen count rate and coarse three-dimensional imaging capabilities.

To improve upon the invention described in applicants' first patent application, the present invention, in accordance with one embodiment thereof, enhances the spatial resolution of the nitrogen image (and thus improves the measurement of nitrogen density) by correlating the low resolution gamma ray imaging with a high-resolution two-dimensional density image obtained using X-ray radiography. This technique enhances the detection of explosives because explosives are generally high in physical density as well as nitrogen content. Advantageously, the resolution and precision obtained using such well accepted and tested X-ray systems is far beyond that which neutron based systems can provide. Thus, by correlating the coarse (but very nitrogen specific) image obtained from the gamma ray detector with the high spatial resolution (but non-nitrogen specific) image delivered by the X-radiography system, a much more meaningful image of dense nitrogen-bearing materials in the object under examination is obtained.

The combination of gamma and X-ray imaging, or other X-ray methods, advantageously provides enhanced features that neither alone can provide. For example, if an X-ray image of an object under examination indicates the presence of an item that could be an explosive during an on-line operation, the combined image of the object may be presented to the operating personnel responsible for detecting such explosives. The gamma ray image can then be used to "color" the X-ray image so that the explosive can be readily picked out from other items seen in the X-ray image. The form of the explosive can also be determined with sufficient accuracy, thus allowing explosives to be shipped, e.g., as ammunition, if declared, in order to confirm that only explosives in the proper form are present.

Another embodiment of the improved explosive detection system of the present invention includes the use of at least one neutron detector. The neutron detector advantageously allows neutron flux to be measured, which neutron flux provides yet another means for obtaining certain density information concerning the contents of the object being examined. That is, by counting the number of neutrons that are able to pass through the object without interacting with atomic nuclei, similar to that which is done in conventional neutron radiography, another reasonably independent measure of the density of the elements within the object is obtained. This additional information further improves the imaging resolution capabilities of the system.

Yet a further embodiment of the present invention includes means for improving the manner in which the gamma ray count signals are processed, and more particularly the manner in which background noise (gamma ray counts due to non-nitrogen elements) is removed from the measured gamma ray spectra. In accordance with this technique, background noise at one point of the gamma ray spectrum is measured, appropriately weighted, and subtracted from the gamma ray spectrum at the point of interest, e.g., 10.8 MeV, in order to remove background noise from the point of interest. This technique of background subtraction is referred to hereafter as the "spectral correlation method" (SCM).

A still further embodiment of the present invention includes the use of an artificial neural system (ANS), a form of a parallel distributed processing technique in order to improve the speed and performance with which the detection system is able to distinguish objects with explosives from objects without explosives.

The present invention may thus be summarized as a TNA-based explosive detection system that includes various combinations of the following improvements: (1) an X-ray system; (2) at least one neutron detector; (3) means for using a SCM, or an equivalent technique, to remove background noise from the gamma ray spectra; and/or (4) an ANS to improve the speed and accuracy with which the decision concerning the presence of explosives is made.

In operation, the present invention functions as follows: neutrons from a neutron source are partially thermalized creating a cloud or bath of neutrons that interrogate the object under examination. The neutrons can easily penetrate into the object being examined, e.g., through the walls or sides of the parcels or luggage. These neutrons are absorbed by or interact with the atomic nuclei of the elements that make up the materials carried within the object being examined. Different elements emit gamma rays at different characteristic energy levels after such neutron absorption or interaction (much like fluorescence). For example, gamma rays emitted from nitrogen have a different characteristic energy level than do gamma rays emitted from hydrogen or carbon for the same neutron exposure. The emitted gamma rays have a high enough energy so that they also easily penetrate through the walls of the object being examined. A suitable detector array is positioned to effectively surround the object as it is examined. This detector array catches or captures the emitted gamma rays and records the number of gamma-rays (i.e., counts the gamma rays) observed at a selected characteristic energy (for example 10.8 MeV, corresponding to nitrogen.) The number of gamma rays of a particular characteristic energy (the gamma ray count) detected by a particular detector depends upon the amount of the element present within the material being examined, the location of the element within the parcel under investigation, the number of neutrons present (the neutron concentration), and the probability that the element will capture a neutron and emit that gamma ray. Because the number of neutrons present is roughly known (or can be roughly measured, which measurement is facilitated by use of one or more neutron detectors), and the probability that the element will capture a neutron and emit a gamma ray is a known constant for any particular element, an analysis of the recorded gamma rays of the selected energy, as well as the neutron flux as measured by the neutron detector, thus provides sufficient information to determine the amount of each element and its location within the material being examined. This determination, in turn, leads to an indication as to whether an explosive material is present within the object under examination.

Advantageously, an even more accurate count of the gamma rays emitted from nitrogen (i.e., gamma rays at 10.8 MeV) is made possible in accordance with the present invention by effectively removing the background noise from the gamma ray spectra at 10.8 MeV using the spectral correlation method (SCM) described herein.

The determination of whether an explosive material is present within the object may also be greatly facilitated, further in accordance with the teachings of the present invention, with the probability of detection (PD) being increased, while maintaining the probability of false alarm (PFA) at acceptably low levels, through the use of the ANS system. The ANS system efficiently processes in parallel the recorded data from all of the numerous detectors within the detector array. Further, the ANS system, unlike conventional statistical discriminate analysis (which may also be used to make the explosive/non-explosive decision), does not require complex and labor-intensive calibration procedures. Rather, by using an ANS, the detection system learns to detect explosive materials by simply being presented with representative examples of objects containing explosive materials. Such a system is not only brought up to speed much quicker than prior detection systems, but is also more adaptable to changing circumstances. For example, the system can in theory be used to detect materials other than explosive materials, e.g., contraband.

The present invention includes, in one embodiment, a specific arrangement and type of detectors, positioned relative a source of neutrons, to detect or count the number of gamma rays so as to provide the proper information needed to ascertain the presence and density distribution of nitrogen. The information may then be readily analyzed by the detection system to indicate the possible presence of an explosive threat. A high count rate of detected gamma rays of a particular energy, for example, immediately indicates the presence of a great deal of nitrogen. The ANS can then quickly determine with a high PD whether the presence of the nitrogen indicates the presence of an explosive material, or whether it indicates the presence of some other benign nitrogen-rich material. Advantageously, with the ANS, the system of the present invention is also capable of detecting explosives in unconventional configurations while maintaining the number of false alarms to a relatively low level. The prior art detector systems, in contrast, while providing for the gross detection of explosives, cannot provide for the more sensitive detection of the unconventional explosive configurations concurrent with a relatively low level of false alarms.

A preferred embodiment of the explosive detection system of the present invention includes the use of efficient inorganic scintillators capable of resolving closely spaced high energy gamma ray lines. Specifically, sodium iodide scintillators are used to provide for detection. It is to be appreciated, however, that other inorganic scintillators such as cesium iodide, bismuth germinate and barium fluoride scintillators may also be used. In addition, inorganic solid state detectors such as lithium-drifted germanium, high purity germanium or mercuric iodide may be used.

The inorganic scintillators of the present invention are arranged to form at least one ring of detectors so as to provide for a detection of a plurality of slices or parallel successive planes of the object under inspection as the object is moved continuously through the ring of detectors. In a specific embodiment of the invention, this ring is broken into sets of C-rings; and in order to provide for a better three dimensional representation, two spaced sets of C-ring detectors may be used with the open ends of the C-rings facing each other so as to provide for a detection completely around the object and with the plurality of successive planes building up a three dimensional profile of the object under inspection. These rings need not all be in the same plane, nor must they be shaped similarly.

The detectors included in the detector arrays of the present invention may include one or more neutron detectors. Such neutron detector(s) are typically separate and may be apart from the C-ring array of gamma ray detectors. Each detector is coupled to appropriate processing circuitry. This processing circuitry may include an artificial neural system (ANS). The ANS allows the signals from each detector to be processed in a parallel distributed processing scheme that provides for a very rapid, yet accurate analysis of the complete data set. In effect, the ANS learns and merges features in the detector observations and automatically generates classification criteria. The ANS has the ability to learn patterns and classify objects based on these patterns. This learning ability is advantageously inherent in the ANS and does not require programming or algorithmic development. The ANS needs only examples from which to learn.

The system of the present invention is further capable of scanning a continuous flow of objects, such as luggage and parcels carried on a conveyor belt. In addition, the operation of the system may be fully automatic so that the system does not depend on operator experience or interpretation, thereby providing for the automatic detection of explosives.

It is a feature of the present invention to provide an explosive detection system that can continuously examine objects for explosive materials at an acceptably high throughput rate, e.g., approximately one object every six seconds.

It is another feature of the invention to provide such a detection system that does not damage film or magnetic recording media.

A further feature of the invention is to provide a detection system that exhibits a high PD at an acceptably low PFA, and that provides an alarm signal indicating the probable presence of an explosive in a particular object prior to the time the object exits the system.

It is yet another feature of the invention to provide an explosive detection system wherein complex and labor-intensive calibration procedures can be minimized, thereby allowing the system to be quickly installed and easily operated.

Still another feature of the invention provides a nitrogen image of the object under investigation. In one embodiment, the spatial resolution of this nitrogen image may be significantly enhanced through the use of X-ray radiography.

A further feature of the invention allows background noise at a specific point in the gamma ray spectrum to be removed, thereby greatly improving the sensitivity of the system to detecting gamma rays at that specific point.

It is another feature of the invention that additional elements, e.g., hydrogen, chlorine, may be identified within the object under investigation, and from that identification improved discrimination of contraband, e.g. explosives or drugs, can be obtained.

Another feature of the invention allows the detection system to learn patterns from examples and classify objects based on these learned patterns, without the need for programming or algorithmic development.

It is still a further feature of the invention to provide a detection system that is readily adaptable to detect a wide variety of different types of explosive or other materials, and/or to quickly correct itself in the event of misclassifying a particular object.

BRIEF DESCRIPTION OF THE DRAWINGS

The above and other features and advantages of the present invention will be more apparent from the following description, drawings and appendices wherein.

DESCRIPTION OF THE PREFERRED EMBODIMENT

The following description is of the best mode presently contemplated of carrying out the invention. This description is not to be taken in a limiting sense, but is made merely for the purpose of describing the general principles of the invention. The scope of the invention should be determined with reference to the appended claims.

Figure 1:
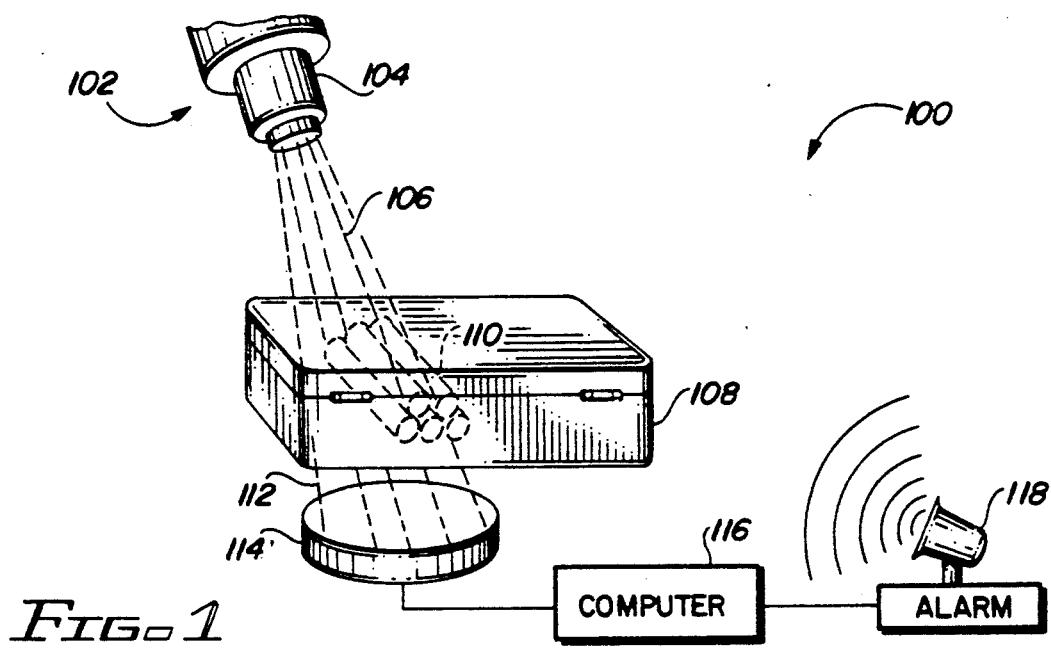
FIG. 1 is a simplified schematic diagram of a nuclear-based explosive detection system.

Referring first to FIG. 1, a simplified schematic diagram of a nuclear-based explosive detection system 100 is illustrated. The system includes a radioactive source 102 that emits neutrons 106. The neutron source 102 may include a nozzle 104, or equivalent structure, that thermalizes the neutrons 106 and points them towards the object under examination, such as luggage 108, so as to irradiate or immerse the luggage and its contents with neutrons. Nitrogen contained within an explosive material 110, placed inside of the luggage 108, interacts with the probing neutron radiation and emits prompt gamma rays 112 of a particular energy level. Non-explosive materials within the luggage may have other elements that also interact with the probing neutron radiation, but the gamma rays emitted from such other elements have a different energy than do those from nitrogen. The number and energy of the gamma rays are measured in detector 114, which detector generates an appropriate output signal for each gamma ray of a particular energy that is received. A computer 116 monitors the output of the detector 114 and, after appropriate signal processing, makes a determination as to whether explosive material is present within the luggage. If so, an alarm 118 sounds, or is otherwise generated (e.g., visually) which alarm alerts operating personnel that explosive material 110 may be present within the luggage 108 so that appropriate action may be taken. Such action may include, for example, automatically diverting the suspect luggage away from the other luggage so that an extensive manual or other search of the luggage and its contents can be made.

Figure 2A:
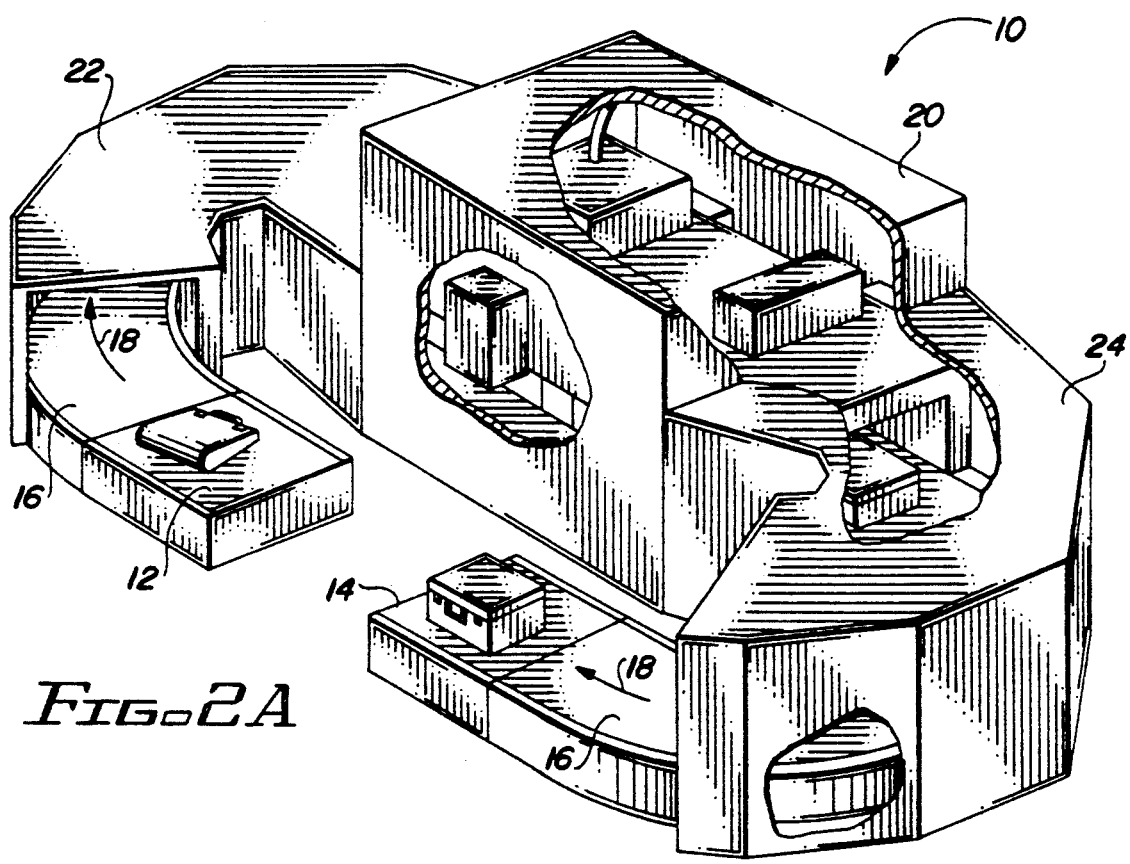
FIG. 2A illustrates a perspective view of one embodiment of a luggage and parcel inspection system.

As shown in FIG. 2A, one type of an explosive detection system 10 in accordance with the present invention includes a loading station 12 (which may consist of a scale to weigh the luggage) and an unloading station 14 (which may consist of a diverter to separate the alarmed luggage from the rest). The loading station leads to a continuous conveyer belt 16 which extends from the loading station 12 to the loading station 16 and has a continuous motion as indicated by the arrows 18. A central shield structure 20 encloses the explosive detection system and with two external wing portions 22 and 24 extending from the central structure 20 to enclose the conveyer belt 16 leading from and to the loading and unloading stations 12 and 14.

Figure 2B:
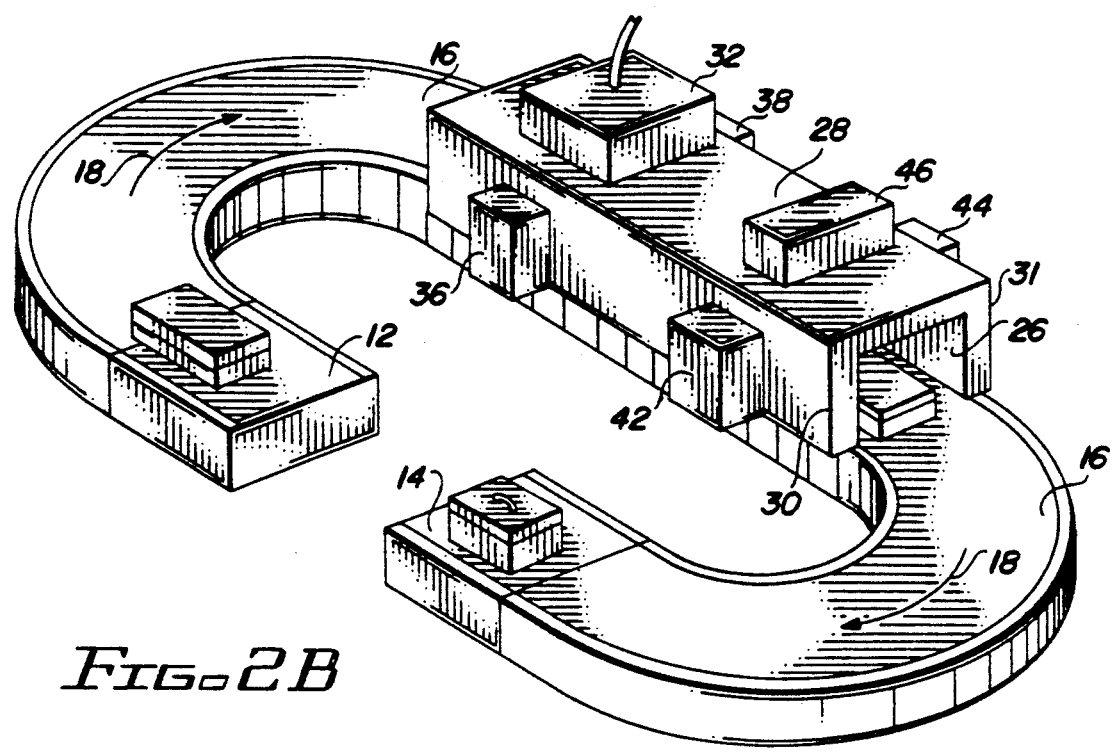
FIG. 2B illustrates the system of FIG. 1 with a shield portion of the system removed.

As can be seen in FIG. 2B, wherein the shields 20, 22 and 24 are removed, the explosive detection system is positioned over a central portion of the conveyer belt 16. Specifically, the explosive detection system includes a cavity structure 26 through which the conveyer belt 16 passes. As shown in FIGS. 2A and 2B, various articles of luggage and parcels may be positioned on the loading station 12 and may then be carried thorough the cavity 26 to the unloading station 14 by the conveyer belt 16.

Figure 3:
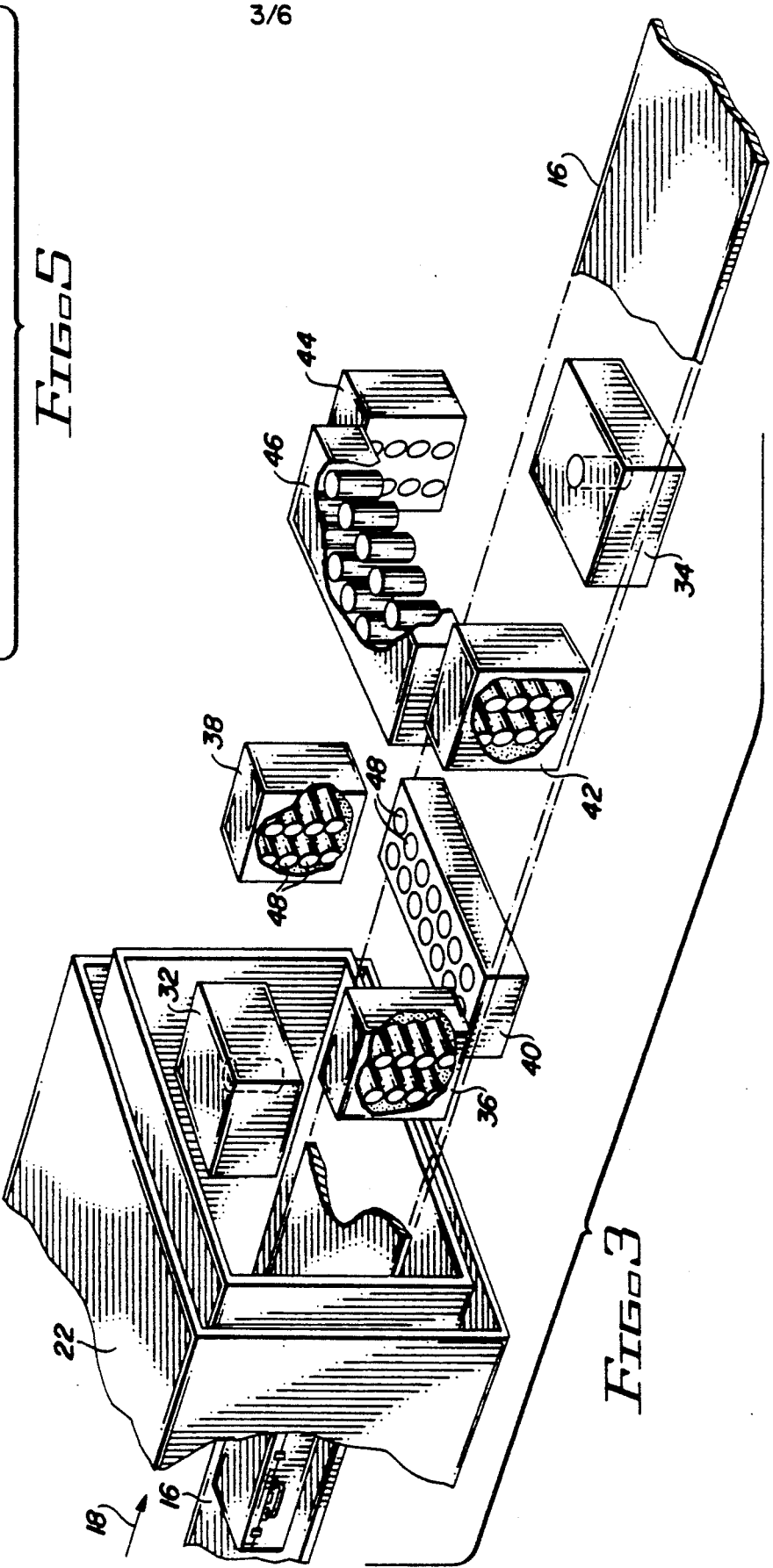
FIG. 3 illustrates one possible arrangement of a conveyer path for the system showing the positioning of a pair of thermal neutron sources and sets of inorganic scintillator detectors comprising a C-ring detector array.

The cavity is formed by external wall members including a top wall 28, side walls 30 and 31 and a bottom wall (not shown) which is positioned below the conveyer belt 16. Extending through the wall members are neutron sources, such as source 32 positioned at the top of the cavity, and as shown in FIG. 3, neutron source 34 spaced from the neutron source 32 and positioned at the bottom of the cavity. Also as shown in FIGS. 2 and 3, detector structures are positioned to form two C-rings of detectors having their opened ends facing the neutron sources. This may be seen in FIG. 3 wherein the side detector structures 36 and 38 together with the bottom detector structure 40 are all associated with the neutron source 32. Similarly, side detector structures 42 and 44 together with the top detector structure 46 are all associated with the neutron source 34.

As shown in FIG. 3, the side detector structures may be provided by two sets of four detectors located in each side detector structure 36 and 38. The bottom detector structure 40 includes two sets of seven detectors. The detectors associated with the neutron source 34 similarly include two sets of four detectors located in each side detector structure 42 and 44 and with two sets of seven detectors located in the top detective structure 46. The detectors associated with the neutron source 32, therefore, form a C-ring of detectors having the opened portion of the C facing upward. In an opposite fashion the detectors associated with the neutron source 34 form a C-ring with the opened portion of the C facing downward. The combination of the two sets of C-ring detectors thereby provide for the detection of a complete ring around the object under inspection to produce a better three dimensional profile of the nitrogen distribution within any particular object passing through both sets of detectors.

While the invention is described with reference to the use of two C-ring detector structures and with each C-ring including two sets of parallel rows and columns of detectors, it should be appreciated that only a single C-ring structure may be used with only a single row and column of detectors. The use of the additional parallel sets of detectors improves a visualization of the profile of the concentration of nitrogen, but a simpler system could be used with a single C-ring and single rows and columns of detectors. It is also to be appreciated that more or less detectors could be used. A full or partial ring of detectors could also be placed out of the plane of the source, around the cavity.

The actual structure of the neutron source and its environment, such as the structures 32 and 34, may be of any type. For example, the neutron source may be a radioisotope (such as $^{252}$Cf) or an electronic neutron source (such as (D,D), (D,T), or other generators). By collisions, mostly with the nuclei of the selected materials surrounding the source the neutrons are slowed down to create a cloud of neutrons within the cavity. The neutrons specifically interact with the variety of nuclei in the luggage or parcel. The interaction of the neutrons produces characteristic high energy gamma rays which are detected by the external rows and columns of the detector(s).

Each detector in the rows and columns preferably are formed of inorganic scintillators. Specifically, all of the detectors, such as represented by a detector 48, may be formed of an inorganic scintillator material, such as sodium iodide (NaI). Other inorganic materials may be used, for example, inorganic scintillator materials such as cesium iodide (CsI), bismuth germanate (BGO-Bi$_4$Ge$_3$O$_{12}$) or barium fluoride (BaF$_2$). Solid state detectors also may be used to provide for the detectors, such as lithium-drifted germanium (Ge(Li)), high purity germanium (HPGe) or mercuric iodide (HGI$_2$). The particular details of a specific detector structure do not form a part of the present invention, but the specific use of an inorganic scintillator with good energy resolution and efficiency to detect gamma rays produced by thermal neutrons provides for a unique detection of nitrogen and/or other elements do form a part of the present invention.

Although inorganic scintillators have been used in the past with thermal neutrons, this use was not for the detection of nitrogen in explosives, but rather to provide for the detection of chlorine, iron, chromium, etc. as a background component and not specifically for the detection of the nitrogen component and spatial distribution of the explosive material. Other uses of inorganic scintillators have been in combination with fast neutron sources so as to detect nitrogen, but this different type of neutron source provides for a different type of detection.

The present invention contemplates the combination of a thermalized neutron source with an appropriate scintillator, e.g. an inorganic scintillator, such as a sodium iodide detector. This specific combination provides for the capability of resolving closely spaced high energy gamma ray lines and specifically for detecting the particular gamma ray lines representative of the nitrogen content of explosives. These particular high energy gamma ray lines occur at 10.8 MeV. The inorganic scintillator detector is preferably used because it is a very efficient detector and because it provides acceptable features in a number of areas. These areas include level of total count rate, the shape of the detector, availability of detector, reliability and cost. It is to be appreciated that the inorganic scintillator may also be used to detect other elements representative of an explosive.

As indicated above, the currently preferred inorganic material is sodium iodide, but other inorganic materials may be used. For example, bismuth germinate has a high effective atomic number because of the bismuth and a higher density than the sodium iodide. The efficiency of a bismuth germinate scintillator is, therefore, higher than that of sodium iodide. However, bismuth germinate scintillators are inferior to sodium iodide in energy resolution and the cost for a bismuth germanate scintillator is much higher than that for sodium iodide, and it also has a background component that can interfere with the nitrogen signal. However, both of these inorganic structures are superior to the organic scintillators used in the prior art devices.

The main advantage of the prior art organic scintillators, which may be plastic or liquid, is their very fast response time permitting exceedingly high count rates. Because of the very high count rates, a high background or "pile-up" from overlapping pulses can be handled and thereby eliminate the need for a sophisticated cavity design. Another advantage of the organic scintillators is their relatively low cost and ease of manufacture. Even with these advantages, however, the use of inorganic scintillators, and specifically in the particular C-ring configuration of the present invention, provides for a higher resolution and thereby a more efficient detection of any explosive material. The organic scintillators are inefficient detectors for high energy gamma rays and their gamma spectroscopical qualities are poor. Organic scintillators thereby have poor energy resolution and make the separation between nitrogen and deleterious signals, such as occur with Cl, Fe, Cr or Ni, very difficult.

As can be seen in FIG. 3, any item to be scanned, such as a piece of luggage, passes through the cavity on the conveyer 16 and is subjected to the thermal neutrons produced by the neutron source 32. At successive positions of the piece of luggage, the individual detectors 48, forming the row 40 and columns 36 and 38, provide for a cross sectional profile of any material containing nitrogen. The C-ring of detectors thereby provides for a two dimensional slice or plane of the nitrogen concentration and with a three dimensional profile built up by the successive slices produced as the luggage moves through the C-ring of detectors.

The two dimensional plane provided by the detector structures 36, 38 and 40 has less resolution at the upper end since the C-ring is not complete. Although a detector structure could also be provided along the upper surface of the cavity such detector structure could interfere with the production of the thermal neutrons by the source 32 of neutrons. A more efficient way of completing the ring is to have a second C-shaped group of detector structures provided downstream of the first group so that the luggage moves from the first C-ring of detector structures to the second C-ring of detector structures and with the open ends of the C-rings in the first and second sets being opposite to each other. The information from the two sets of C-rings of detector structures may be merged electronically in a computer to provide for a complete picture. As indicated above, this picture forms a three-dimensional image of the container such as the luggage and its contents by building up the successive slices or planes of information.

Figure 4:
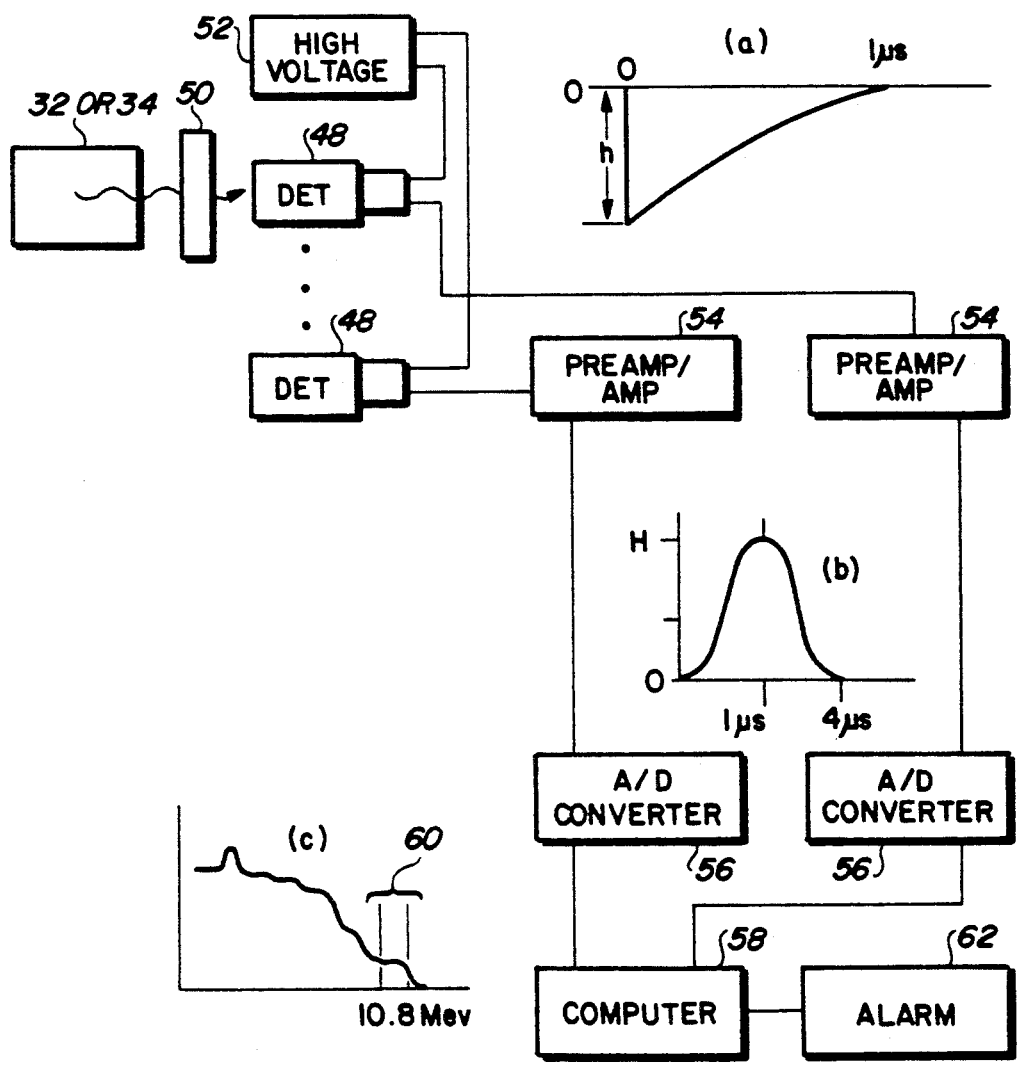
FIG. 4 is a block diagram of the system showing the detection of particular gamma rays used in the detection of explosive material, with waveforms (a), (b) and (c) in FIG. 4 being representative of the signals at particular points in the system.

FIG. 4 illustrates in general the detection of the information by any one of the individual detectors 48. As shown in FIG. 4, neutrons from the sources, either 32 or 34, are thermalized and impinge on a piece of luggage or parcel as represented by the block 50. The individual detectors 48 forming the C-ring detector structures, each detect the production of gamma rays. The reaction between the thermal neutrons and the nitrogen in the explosive or other material, is as follows:

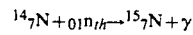

The first factor in the above equation is the nitrogen in the explosive or other material within the luggage. For example, wool, cotton, etc. all contain nitrogen. The nitrogen when bombarded with thermal neutrons, as shown by the second factor, produces nitrogen in a changed form (another isotope of nitrogen) plus gamma rays, of which approximately 14% are at 10.8 MeV. Each gamma ray as detected by a detector 48 produces an output from the detector as shown in waveform (a) in FIG. 4. As can be seen, the detector 48 produces an output signal having a height "h" and decaying exponentially to zero in approximately one micro second. The detectors 48 are supplied with a high voltage from a high voltage source 52. The height "h" and the area under the decaying signal are both proportional to the gamma ray energy.

The output from each detector 48 is passed directly through a preamp and amplifier 54 to produce an output signal as shown in waveform (b) in FIG. 4. It can be seen that the individual gamma ray is converted from the exponentially decreasing signal to a pulse signal having a height "H" which is proportional to the area under the signal shown in waveform (a). It is to be appreciated that each gamma ray received by each detector 48 produces successive signals whose amount represents the concentration of nitrogen.

The output from the preamp/amplifier 54 is passed through an analog to digital (A-to-D) converter 56 to produce a digital number representing the height "H" of the waveform (b) of FIG. 4. It can be seen, therefore, that the outputs from A-to-D converters 56 are a series of digital numbers representing the detection of gamma rays, whose number in turn represent the concentration of nitrogen. A small range of the digital numbers correspond to the gamma rays of interest. As more and more gamma rays are detected at each detector, the digital number from the A-to-D converters 56 at each point in time is counted. The counts of each digital number which occurs, which is proportional to the number of nitrogen gamma rays incident on the detector, are then coupled into a computer 58 for computation of a profile for each slice or plane of the object under observation and for the production a three dimensional representation of the concentration of nitrogen of the object. Waveform (c) illustrates the profile of the spectrum received by the detectors 48 and with the space 60 between the two lines representing the area of interest, more specifically the gamma rays representing nitrogen.

An alternative technique (and a preferred technique in most instances) for processing the detector signals, and in particular for accurately counting the signals at a high rate, is described in Drndarevic, Ryge & Gozani, "A Signal Processor for High Counting Rate gamma ray Spectroscopy with NaI(T1) Detectors," *IEEE Proceedings of Nuclear Science* (Feb. 1988), which article is incorporated herein by reference. The processor described in the referenced article advantageously addresses the problem of "pile up" and allows very few valid pulses to be lost while minimizing interfering background noise.

Figure 5:
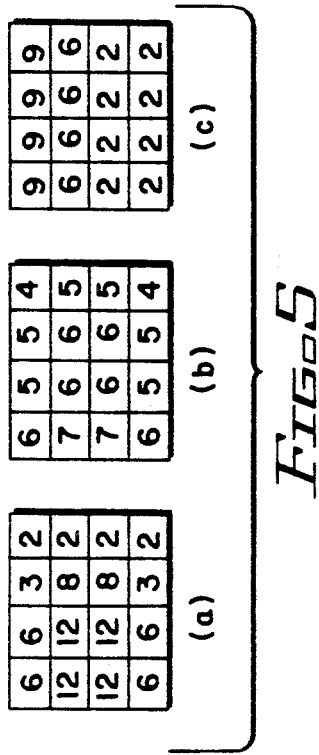
FIG. 5(a), (b) and (c) illustrate typical spatial profiles of nitrogen concentration for explosive and non-explosive materials.

FIGS. 5(a), (b) and (c) illustrate typical profiles for explosive material in a block form; nonexplosive materials, such as a wool coat or jacket; and explosive material in sheet form. As can be seen in FIG. 5(a), which represents the detection from one column of detectors at four successive planes as the object moves past the detectors, the high readings of 12 in two successive planes and 8 in the third successive plane, represent a high concentration of nitrogen rich material probably representative of a block of explosive material. The detectors in the other column and along the row would confirm the presence of such block material. The large difference between readings in the profile of FIG. 5(a) show an unusual density of nitrogen material not typical in other types of items which contain nitrogen.

For example, FIG. 5(b) illustrates an item such as a wool coat or suit which may contain a relatively high amount of nitrogen, but with the nitrogen spread out in a diffuse pattern which would not be representative of an explosive material. Although the overall nitrogen content of the wool article is quite high, the concentration does not reach the levels of explosive material.

FIG. 5(c) illustrates an explosive material in a sheet form along one side or edge of the luggage and again, the concentration of nitrogen and high readings relative to the lower readings indicates the presence of something having a relative high concentration of nitrogen, plus a relatively high density for this concentration. This again would typically be a profile of an explosive material. The computer 58, therefore, may be programmed to identify such specific profiles and provide for an alarm such as through an alarm 62 so that the luggage or parcel may be subjected to a more thorough inspection.

Figure 6:
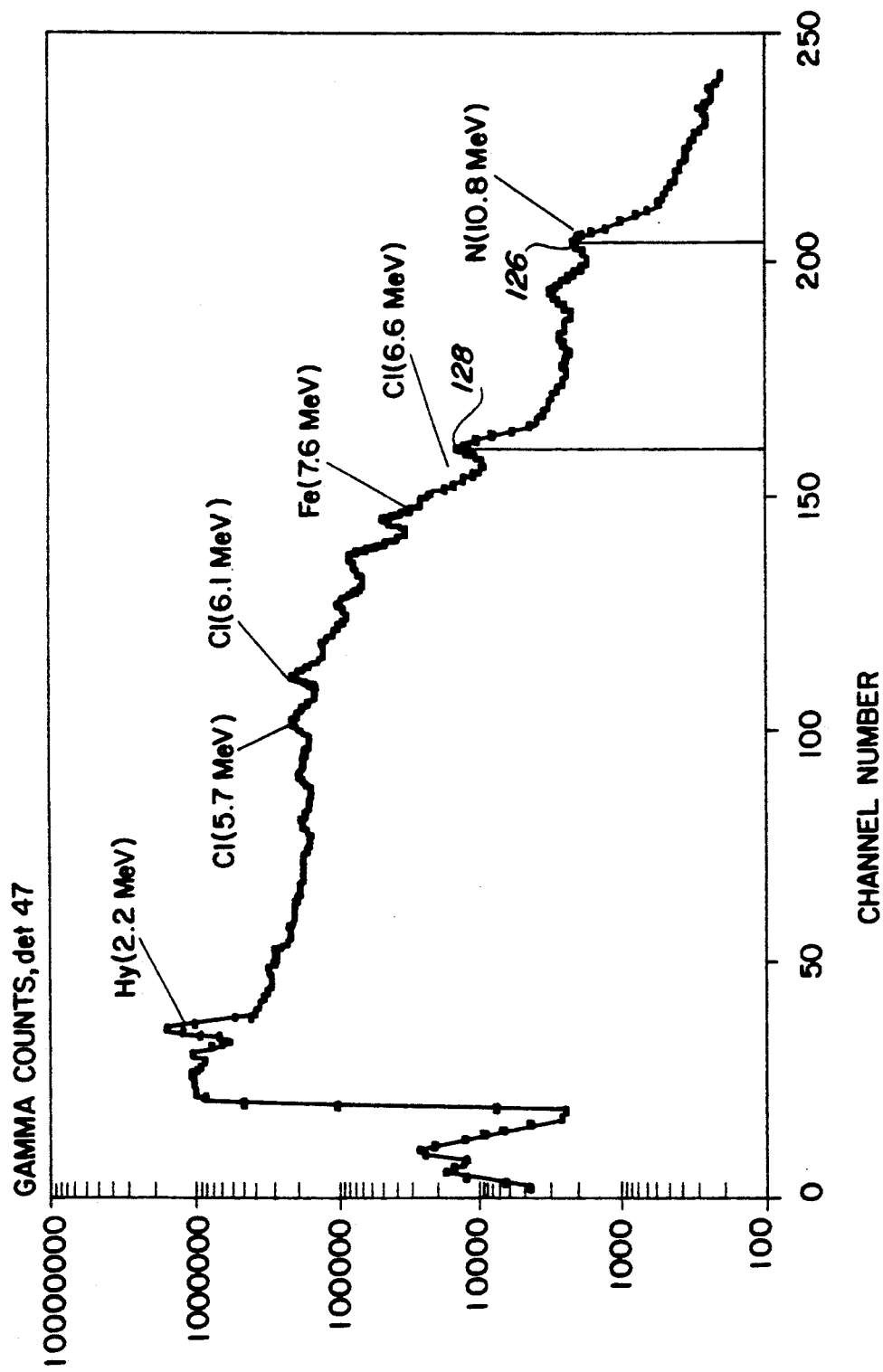
FIG. 6 illustrates a typical thermal neutron activation gamma spectrum, and further illustrates the manner in which background noise form one area of the spectrum is subtracted from another area of the spectrum in order to remove background noise.

Referring next to FIG. 6, a typical thermal neutron activation gamma ray spectrum is illustrated. The vertical axis represents the gamma ray count; the horizontal axis represents the particular channel number through which the count is detected. As each channel is set up to measure a particular energy level, the horizontal axis is thus proportional to the various energy levels of the detected gamma rays. A good description of the types of instruments and measurement techniques used to detect nuclear radiation, such as gamma rays, may be found in, e.g., *Nuclear Instrumentation*, Section 1.5, pp. 4–18 (McGraw-Hill Series in Nuclear Engineering).

In FIG. 6, it is seen that the gamma ray peak 126 corresponding to nitrogen, labeled "N (10.8 MeV)", has a smaller amplitude than does the surrounding background noise. Thus, in order to better detect the gamma rays occurring at 10.8 MeV, the present invention contemplates using a spectral correlation method (SCM), or similar technique, to reduce the background noise. Essentially, the SCM determines the background noise at the desired location of the spectrum i.e., the nitrogen peak, by correlation with other spectral regions such as near the chlorine peak 128 (8.6 Mev). Interferences from weak peaks in the desired region can be determined by measuring an associated strong peak elsewhere in the spectrum and subtracting the appropriate fraction from the region of interest. As the sources of background noise in the system are fundamentally related over the entire spectrum, i.e., the noise at one location is related to the noise at another location, this background subtraction technique has the desired effect of removing much of the background noise near the spectral peak of interest.

FIG. 6 also shows additional gamma ray peaks which correspond to other elements, e.g. hydrogen, chlorine. Gamma rays detected in these peaks can be used to measure the amount of elements other than nitrogen present in the object under investigation. Measurements of these elements are used to further enhance the detectability of contraband, e.g. explosives, in the object. For example, explosives typically exhibit hydrogen in combination with nitrogen. Thus, the presence of a characteristic nitrogen signal without a characteristic hydrogen signal is not typical of most explosives, whereas the presence of a characteristic nitrogen signal in combination with a characteristic hydrogen signal is typical of most explosives.

Figure 7:
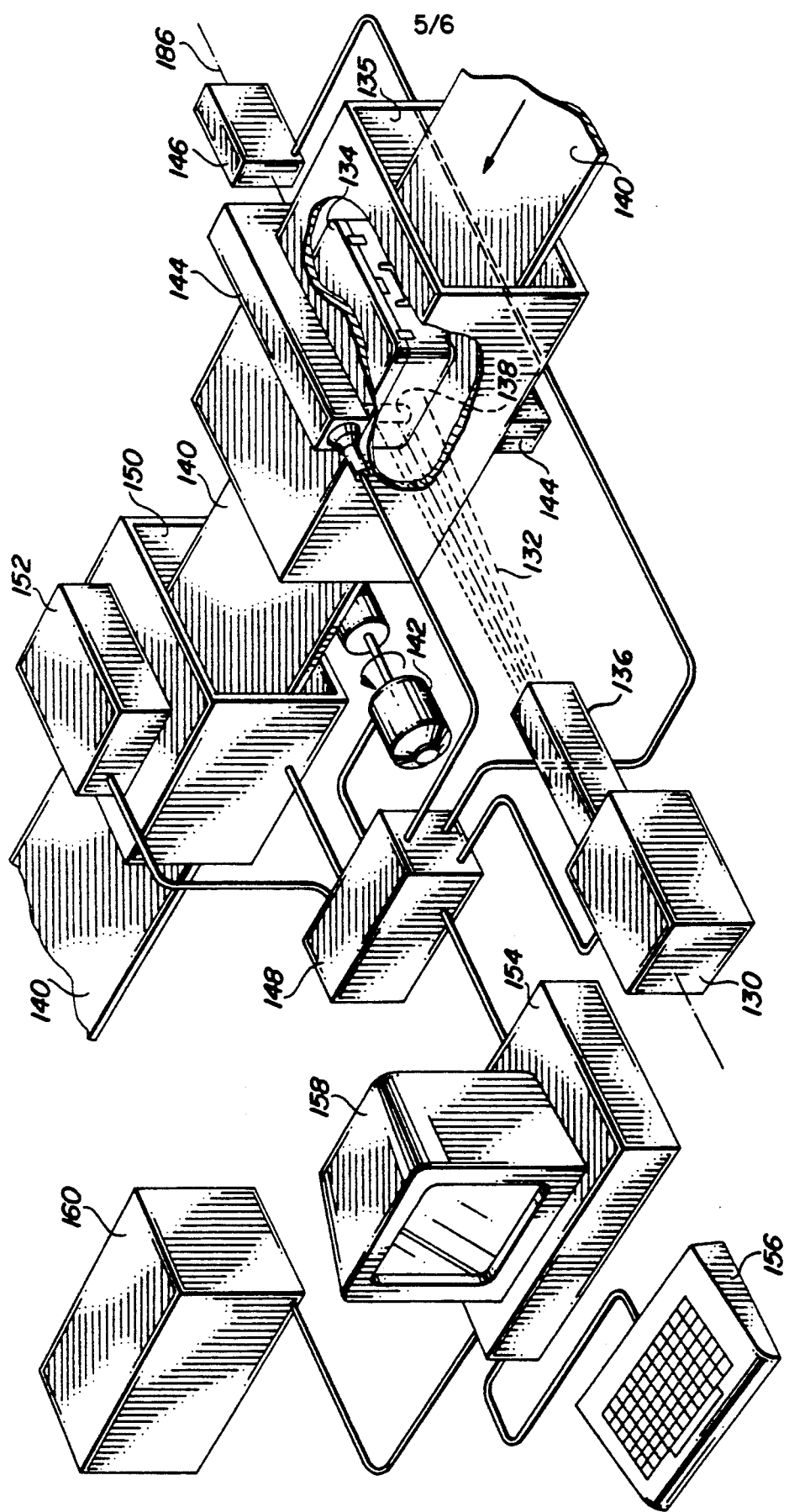
FIG. 7 schematically illustrates the neutron detection system of the present invention combined with an X-ray system.

Referring to FIG. 7, a schematic representation of the principal hardware components that may be included in a further embodiment of the present invention is illustrated. Neutrons 132 from a source of neutrons 130 are directed to a parcel or object 134, the contents of which are to be investigated. If desired, a collimator 136 may help to further direct the neutrons 132 so as to irradiate a desired cross sectional shape at the point where the neutrons enter the object 134. As shown in FIG. 4, for example, the cross sectional shape of the irradiated portion may assume that of a narrow rectangle 138.

The object 134 is carried past the source 130 of neutrons 132 within a shielded chamber 135 on a conveyor belt 140, or equivalent parcel-carrying mechanism. The conveyor belt 140 is driven by a motor 142 in a continuous or step-wise fashion. The conveyor belt 140 continues to carry the object 134 through a chamber of an X-ray system 150 wherein a source of X-rays 152 and a corresponding detector (not shown) are used to produce an ordinary electron density image of the object and its contents.

An array 144 of gamma ray detectors are selectively positioned around the object 134 near the region where the object is irradiated by the neutron cloud or beam 132 within the shielded chamber 135. It is to be appreciated that while only one array 144 of such detectors is shown positioned above the object 134, several such arrays may be used, e.g., one above the object as shown, one below the object, and one behind the object, thereby forming a C-ring that effectively encircles the object 134 as it is irradiated, as shown in FIG. 3. In addition to the array of gamma ray detectors 144, at least one neutron detector 146 is placed behind the object 134 opposite the source of neutrons 130. This neutron detector 146 captures some of the neutrons that pass through the chamber 135 and the object 134. Additional neutron detectors may be placed at other locations in the cavity.

Appropriate control circuits 148 interface with the above-described components. The control circuits, in turn, are monitored or driven by a suitable computer 154. The computer 154 includes conventional input/output devices, such as a keyboard 156, a terminal display screen 158, and/or a printer (not shown). A non-volatile memory storage device 160, such as a disk or tape memory, may also be coupled to the computer 154, as required, in order to retrieve or track the large amounts of data that may be needed to examine a large quantity of objects for specified contraband.

In operation, the object 134 is irradiated by the neutrons 132 in sections or slices as the object moves past the beam. The gamma rays resulting from the interaction of the neutrons with atomic nuclei in the object are detected in the gamma ray detector array 144. Neutrons that pass through the chamber 135 and object 134 are detected in the neutron detector by each detector 146. The number of gamma rays at specified energy levels detected by each detector in the array provides a measure of the particular element, or combination of elements, present within the irradiated slice or section of the object characteristic of that level of gamma ray emission. By combining this information from all of the detectors, as well as by considering the number of neutrons that pass through the object without interacting with atomic nuclei (as sensed by the neutron detector 146), a more accurate density distribution of the elements within the irradiated section of the object may be obtained. By combining such density information for all of the slices of the object that are created as the object moves past the neutrons 132, a three-dimensional density image of the contents of the object can thus be formulated.

Advantageously, the nuclear density information obtained using the gamma ray and neutron detectors as above described can be further enhanced by combining it with the electron density information obtained from the X-ray system 150. If such combined density information suggests the presence of contraband, the object is flagged for further investigation (e.g., diverted off of the conveyor belt for a manual search).

Referring back to the embodiment of the invention in FIG. 4, it is seen that the outputs of the A/D converters 56 are directed to a computer 58. It is one of the main functions of the computer 56 to analyze the data (e.g., the number of gamma rays at a particular energy) sensed by each of the detectors 48 in order to accurately and rapidly classify an object as one with or without explosives. A similar function must be performed by the computer 154 shown in the embodiment of FIG. 7. (Other functions, such as record keeping and miscellaneous housekeeping functions associated with the explosive detection system may also be performed by the computers 58 or 154, but such functions are viewed as conventional functions and will not be described herein.)

There are a number of data analysis techniques that can be used within the computers to achieve their classification function. Two such approaches are described herein: (1) standard decision analysis; and (2) artificial neural system (ANS) analysis. Of these two approaches, the preferred approach is ANS because, as indicated below, it provides a PD that is as much as 2.5% greater than the PD achieved using standard decision analysis at the same throughput and PFA levels.

Regardless of which approach is used, however, it is helpful in some instances (but not all instances) to first identify certain "features" that are present in the detector and other data. By identifying such features within the data, and presenting such features to the ANS system (as opposed to presenting raw detector data to the ANS system) the classification function can be significantly simplified, even though the set-up and calibration of the ANS system (i.e., the process of determining the features) may be somewhat more complicated.

Each individual detector in the system produces some information about the amount and location of the elements, e.g., nitrogen, in the object under examination. Unfortunately, due to interference with other elements, statistical fluctuations, and the like, there is a substantial amount of noise present in the system. In fact, the signal-to-noise ratio for any single detector is rather low. This low signal-to-noise ratio can be improved somewhat by combining the information from several detectors with overlapping fields of view. For example, by averaging two detectors, the signal-to-noise ratio can be improved by a factor of the square root of two. Generally, however, combining more and more detectors worsens the spatial resolution of the system. Hence, a tradeoff must be sought that provides an acceptable signal-to-noise ratio on the one hand and an acceptable spatial resolution on the other hand. Both criteria are required to improve the ability of the system to detect explosives.

To satisfy both the spatial resolution and signal-to-noise ratio requirements, it is thus helpful in many instances to define a set of "features" with different amounts of noise resistance that still provide helpful and adequate spatial information. A "feature" may thus be any combination of detector signals in the detector array. Some of the features may be simple; others may be complicated (such as the reconstructed three-dimensional nitrogen density distribution), and may require imaging techniques. A set of features can be defined by: (1) calculating or estimating certain anticipated features that would normally be present for a set of typical objects (e.g., pieces of luggage) containing explosives; (2) developing calibration techniques using different sets of these features; and (3) testing the performance of the calibration techniques on a test set of data.

Experiments have shown that the variance for any feature is roughly the same for objects with explosives as it is for objects without explosives, even though, of course, the values of the feature may differ between the two classes of objects. It is also true that the distribution of "bombness" (i.e., the likelihood of explosive materials being present) in objects, such as suitcases, is decidedly non-normal. Most suitcases, for example, contain little nitrogen, and are thus quite easy to classify as non-threatening (containing no explosives). However, a significant percentage of the pieces of luggage encountered in airports and similar locations contain sufficient nitrogen and other interfering materials to falsely alarm the detection system, absent some further classification criteria. The distribution of "bombness" thus follows (roughly) the distribution of nitrogen, that is, with most pieces of luggage occurring at low levels of threat but with an extensive tail to the distribution. The addition of a simulated threat shifts the distribution without distorting its shape. This results in the variance for any feature being the same for objects with and without threats, as stated above.

Standard Decision Analysis

The first (and more conventional) approach used to classify the objects under examination as containing or not containing explosives is referred to as standard decision analysis. The basic technique used in standard decision analysis is linear discriminant analysis. In linear discriminant analysis, a discriminant value is computed by a linear combination of the values of a set of features measured for a piece of luggage. If the discriminant value is greater than some prescribed threshold, e.g., zero, the piece of luggage is classified as containing a threat; otherwise, the piece of luggage is cleared.

Geometrically, the features are axes which define the classification hyperspace. The measurement of any particular piece of luggage (e.g., suitcase) is plotted as a point in this space. The points for suitcases without threats cluster separately from those with threats. The hyperplane that best separates the two clusters may be viewed as a dividing surface that results from the linear discriminant function. In fact, the computed discriminant value is just the normal distance of the hyperplane from the point which represents the piece of luggage, with the sign (positive or negative) representing which "side" of the hyperplane the point is on. Quadratic or other functional forms may be used for the discriminant, which will result in dividing surfaces which are something other than planes.

Application of the usual least squares technique to the classification problem results in the dividing hyperplane being perpendicular to the line that joins the centers of the two clusters. This plane is also halfway between the two centers, if the distance is measured after normalization by the covariance matrix. Any overlap between the two clusters determines the possible tradeoff between detection and false alarm rates. By moving the dividing hyperplane along the line joining the two centers (which is equivalent to changing the threshold the discriminant value must exceed) this tradeoff can be set to any level, from zero false alarm rate (and a low detection rate) to 100% detection and a commensurately higher false alarm rate. In addition, the value of the discriminant implies a "sureness" for the decision. This value may be used in some kind of Bayesian analysis or may simply map onto the tradeoff curve as the PD/PFA point that would result if the threshold were set at that value.

Unfortunately, in practice, the development of the discriminant is a complicated problem. First, a classification of the detector data set must be made so that pieces of luggage which result in similar instrument responses are grouped together. For example, large heavy suitcases are analyzed as one group. Next, the set of features to be used in each group must be chosen. The computation of the discriminant coefficient is relatively straightforward once the features are chosen. A variety of computer programs are commercially available for performing this computation. Some adjustments must be made to improve performance by allowing some regions of the decision space to have special decisions made. These are situations where a "by hand" technique takes advantage of the fact that the distribution of the objects under investigation is non-normal. Finally, the resulting calibration is tested on a set of data not used in the calibration and, eventually, on-line during the supervised tests. Experience using this technique has revealed that a separate calibration must usually be developed for the bulk and sheet explosives due to their different measured response in the system. Unfortunately, a significant amount of time, e.g., several days of statistical analysis, is typically required in order to correctly perform this discriminant development and calibration.

It is preferred that the robustness of this calibration procedure be tested, and that based on such test, adjustments be made as required in order to provide a robust calibration. Testing robustness may be performed by taking a large data set (obtained from passing a large number of pieces of luggage through a detection system as herein described) and breaking it into several different groups or subsets. A calibration may then be performed on all but one group of subset, and then tested on this last subset. Each subset in turn is then used as the test subset in a manner similar to that used in jackknife analysis. The difference between the performance of the calibration on itself and on the test subset provides a measure of robustness. A large difference indicates poor robustness. The number of classification groups and features in each group may then be chosen and adjusted as required until the calibration becomes robust.

Artificial Neural System (ANS) Analysis

An (ANS) may be described as a collection of simple processors (neurons) that are connected in a massively parallel network. In one embodiment of an ANS, each neuron accepts inputs from several others with a different weight applied to each link. If the sum of the weighted inputs exceeds some present value, the neuron "fires" and sends its output signal to other neurons. Some neurons (the input layer) connect directly to the available inputs to the ANS. Other neurons (the output layer) connect to the desired output signal (which, in the case of an explosive detection system, comprise output signals ranging from "no threat" to "must be a threat"). Training or calibration objects are presented in the form of the input signals corresponding to a desired output, and the weights in the network are adjusted according to a learning rule until the network predicts the correct desired output. The weights are then frozen, and the trained ANS is then used on a test set of data to identify threats. Advantageously, the training step requires no operator intervention once the data is assembled; the network is simply allowed to iterate to a solution. If the proper network architecture has been established, the ANS can be trained with far less operator involvement than with the discriminant analysis approach described above.

It is seen that an ANS is simply one form of a parallel distributed network (PDN) made up of processing elements (PE's) that are interconnected via information channels called interconnects. Where these PE's perform a simple function, such as "on" if the weighted inputs thereto exceed a prescribed threshold, and "off" if not, these PE's may be referred to as "neurons." Each PE or neuron may have multiple input signals, but typically only one output signal (although this output signal may be connected to several different locations within the ANS). The PE's are arranged in several different layers. A first or input layer of PE's is generally characterized by each PE having an input that comprises one of the input signals to the PDN. An output layer of PE's is characterized by each PE providing one of the output signals of the PDN. The output signals from each PE in the input layer comprise the input signals to the PE's of other layers, either in a feedforward or feedback interconnect, and these interconnections, as indicated, may be weighted by an appropriate factor. For simple PDN applications, two layers of PE's may be sufficient, in which case the PDN comprises only an input layer and an output layer. For more complex applications, one or more hidden layers of PE's may be required intermediate the input and output layers. The complexity of the PDN is largely governed by the number of layers of PE's. The general structure of a three-layer PDN or ANS, for example, is illustrated in FIG. 6. This particular three-layer ANS is further discussed below.

Parallel distributed networks are described in the art. See, e.g., Rumelhart, et al., *Parallel Distributed Processing*, Vol. I (MIT Press, 1986). In general terms, such systems are characterized as including: (1) a set of processing units or elements; (2) a state of activation (i.e., the current state of the element); (3) an output function for each element (i.e., a function that defines the output signal as some function of the input signals); (4) a pattern of connectivity among the processing elements; (5) a propagation rule for propagating patterns of activities (signals) through the pattern of connectivities; (6) an activation rule for combining the inputs impinging of a processing element with the current state of that element to produce a new level of activation for the element; (7) a learning rule whereby patterns of connectivity may be modified by experience; and (8) an environment within which the system operates.

One advantage of using an PDN or ANS is that it can adapt or self-adjust the strength of the interconnections between processing elements. Self-adaptation allows an ANS to "learn" and to eventually improve in overall system performance.

Learning results from application of a selected learning rule. Most learning rules comprise variants of the Hebbian learning rule which states that it two units (processing elements) are highly active, the strength of the interconnect between these two units should be strengthened. A variation of this learning rule is the delta rule. According to the generalized delta rule, the amount of learning (i.e., the strength or weight of the interconnect between two processing elements) is proportional to the difference (or delta) between the actual activation achieved and a target activation provided by a teacher. This delta rule is discussed at length in Chapters 8 and 11 of Rumelhart reference, cited above, and several variations or extensions of the rule exist. The delta rule, its variations and/or extensions, provides the primary learning rule utilized by the ANS of the present invention. Although other learning rules, known or yet to be developed, could of course be used with the explosive detection system, use of the delta rule advantageously provides an effective way to accurately teach the ANS how to recognize an object containing an explosive based on using objects having known explosives as the "teacher".

The particular learning rule selected for a given application is often referred to in the art as a "paradigm of learning." As indicated, numerous paradigms of learning exist and are documented in the art.

Two variations of an ANS-based explosive detection system are contemplated by the present invention: (1) a system wherein the raw data from the detectors (the detector counts) comprise the input signals to the ANS; and (2) a system wherein developed "features" from the raw detector data, as described above, comprise the input signals to the ANS.

In accordance with the first variation, the ANS is initially taught by presenting to it detector counts for objects being examined and the category of each object (whether or not an explosive is present). These objects comprise a training set of objects. The ANS then adjusts the interconnection strengths between the various processing elements, using an appropriate learning rule, such as the delta rule, to assure the correct classification of each object in the training set. Observations (e.g., detector counts) for different objects (not in the training set) are next presented to the ANS, which in turn, classifies each object based on the strength of the interconnections resulting from the training set. Advantageously, using raw data from the detectors, (as opposed to using "features" of the detectors), significantly reduces or eliminates the time-consuming steps of computing and developing features. Disadvantageously, use of raw detector data requires a significantly longer training time for the ANS. This is because the number of detectors, and hence the number of inputs to the ANS, is significantly larger than is the number of detector features, resulting in a much more complex (increased number of levels) ANS that must be used. For example, use of raw detector data (assuming detectors similar in scope to these shown in FIGS. 2 and 3) requires around 200 input neurons (signal connections) to the ANS. With 200 input signal lines, two hidden layers of PE's in the ANS are required in order to achieve a reasonable performance. In contrast, use of detector features requires only around 20 input neurons, and thus greatly simplifies the complexity of the ANS. For this reason, the use of detector features is preferred over the use of raw detector data as inputs to the ANS neurons.

Figure 8:
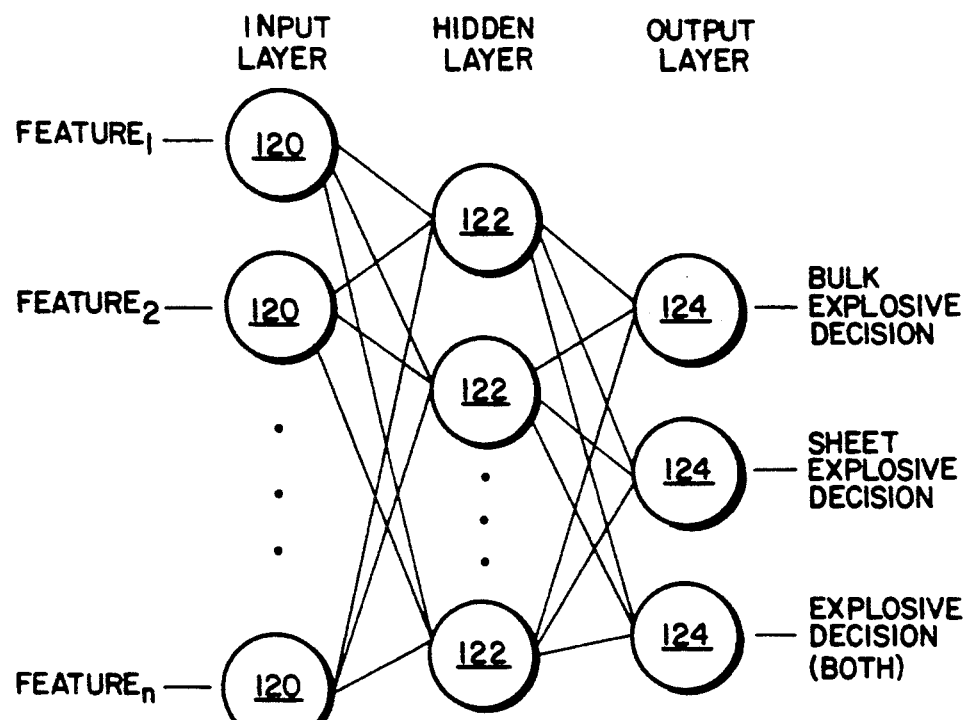
FIG. 8 depicts a three layer back propagation network of a preferred ANS that may be used in analyzing the detector data of the present invention for the purpose of classifying whether the object under investigation carries explosives.

In accordance with the second variation of the ANS-based detection system, "features" are developed from the detector signals as described above. These features comprise the input signals to the ANS. A diagram of a preferred ANS used with this variation is shown in FIG. 8. This ANS comprises a three-layer, fully connected, feedforward network. The network includes a first layer (input layer) of neurons (or PE's) 120. This input layer receives a set of pre-computed feature vectors from the explosive detection system that have been normalized to gray scale values between −0.5 and +0.5. A middle layer (hidden layer) of neurons 122 learns to encode features that are not explicitly present in the input patterns. A last layer (output layer) of neurons 124 produces a gray scale value that can be compared to a threshold to obtain a decision. The output layer is coded with +0.5 if the object being examined contains an explosive threat, and −0.5 if it does not. While the steps of computing and developing such "features" for use with this second variation may consume a noticeable amount of time, once a set of features has been developed, the number of input neurons for the ANS can be significantly reduced, and the complexity of the ANS network can be greatly simplified, over that which would be required if the first variation were used (raw detector data connected directly to the input neurons of the ANS).

Advantageously, by using the network shown in FIG. 8, no preclassification (large, small, etc.) of the objects, such as is used in the discriminant analysis approach, is required. The list of features fed into the network may include all those that are used with the discriminant functions, which features may include some which have significant collinearity. Training of the network is accomplished by presenting a training data set to the network over and over again, at a relatively low learning rate. Advantageously, such training can occur with only minimal human supervision. Back Propagation (BP) is used as the paradigm of learning for the system. BP is based on the generalized delta rule, mentioned above, and is well documented in the art. Essentially, this rule is a steepest descent method of computing the interconnection weights between neurons of the ANS that minimizes the total squared output error over a set of training vectors. Evaluation of the effectiveness of the ANS network may be judged by simply observing the residual error (as the network can be expected to make errors and have false positives), and/or by simply measuring the PD and PFA rates for a test set of objects.

Figure 9:
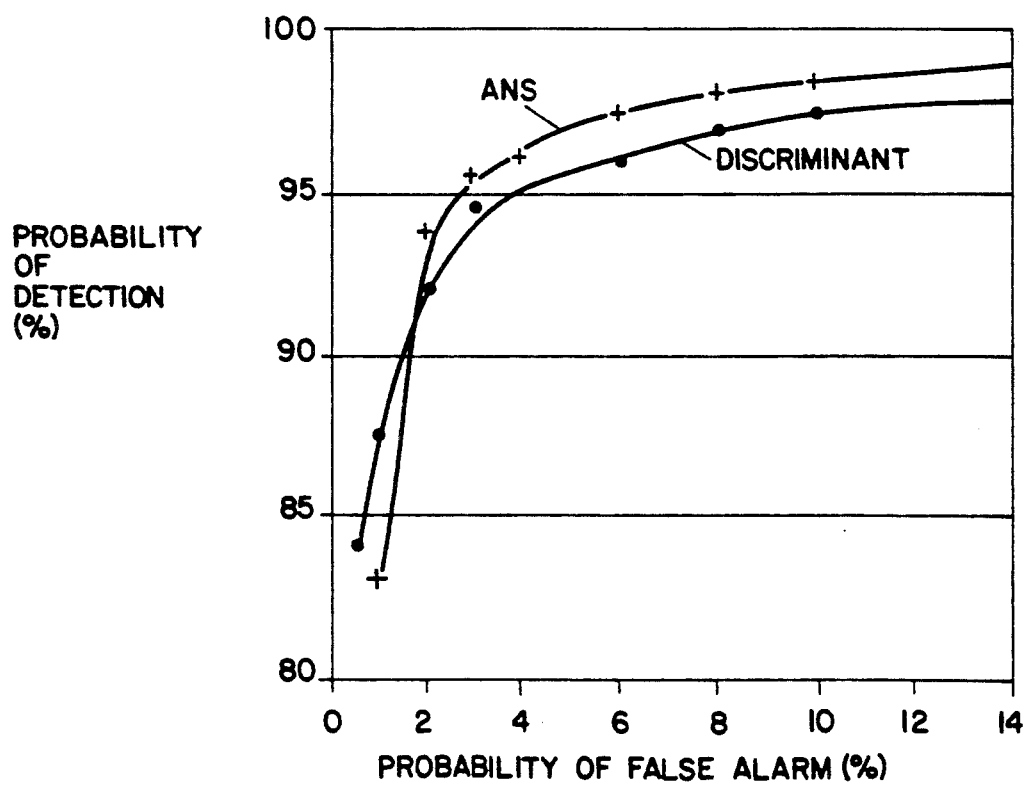
FIG. 9 is a graph that compares the probability of detection and the probability of false alarms obtained with an explosive detection system using an ANS analysis of the detector data verses an explosive detection system using a more conventional discriminate analysis of the detector data.

A performance comparison between an explosive detection system using the discriminant analysis approach and one using an ANS trained by the BP technique is depicted in FIG. 9. The performance of both techniques is evaluated on a test set of objects that is different from the training set. Since the outputs of both techniques produce gray scale values, different thresholds can be applied to get different performance points on the PD PFA tradeoff curve. Each curve in FIG. 9 was generated by changing the thresholds for the decision over the applicable range.

FIG. 9 clearly shows that the ANS approach performs better than the discriminant analysis approach for false alarm rates greater than 1.75%. For example, at the operating point of 95% detection (which is a typical operating point for a viable explosive detection system), the ANS reduces the false alarm rate by around 1.5–2.0%. Advantageously, for an explosive detection system having a high throughput of objects, this results in substantially fewer objects having to be scanned or checked by secondary techniques. At slightly higher detection rates, e.g., 96%, the ANS reduces the difference between the PFA rates still further (even though the value of the PFA goes up for both approaches).

One advantage offered by the BP-trained ANS network over the discriminant analysis approach is that ANS takes relatively less human supervision. As noted above, calibration of the discriminant analysis may require several days of statistical analysis. With the BP technique, only a few hours of set up time are required by a computer literate person, and a day or two of computer time (to train the system).

As seen in FIG. 9, the performance of the ANS network at low false alarm rates (less than 1.75%) is substantially lower than for the discriminant analysis technique. This is believed to be caused by the particular activation function used in the ANS network. (The activation function is that function which defines the relationship between the output of a particular neuron and its input(s).) The sigmoid function was used, and this function is very steep in the middle (i.e., at net input values close to zero). Consequently, most of the output activation values tend to cluster around −0.5 and +0.5. Inevitably, there will be a few non-threatening objects that have similar characteristics to threatening objects. In these instances, the non-threatening objects will also have a value close to +0.5. In order to remove these objects, the threshold would need to be adjusted close to +0.5. However, doing so would cause the detection rate to drop rapidly. Hence, it is believed that a better solution to this problem (of low performance at low PFA rates) is to use a smoother activation function.

The ANS portion of the present invention may be implemented through custom software and/or hardware installed in or coupled to the computer 116 (FIG. 1) or the computer 58 (FIG. 4), hereafter the "host" computer. One implementation, for example, includes an array processor network, or "card", that is installed in or coupled to the host computer. A suitable array processor network that can perform this function is described in U.S. patent application Ser. No. 07/191,207, filed 05/06/88, (assigned to the same assignee as is this application), which patent application is incorporated herein by reference. The advantage of using an array processor of the type described in the referenced patent application is that the ANS computations can be quickly performed, with many of the computations being performed in parallel.

Another implementation involves modeling the ANS using software. A suitable modeling program that simulates an ANS network on a conventional IBM PC/AT or compatible computer, for example, is commercially available from Science Applications International Corporation (SAIC), San Diego, CA 92121 under the name of "ANSim." By using the ANSim program, an IBM PC/AT or compatible computer, and related equipment as detailed in applicants' prior application, Ser. No. 07/367,534, which application is incorporated herein by reference, it is thus possible to readily model the ANS portions of the present invention.

In conclusion, the present invention is directed to an explosive detection system using neutrons from a source to impinge on a object potentially containing explosive material and with the neutrons reacting with the nitrogen or other elements contained in the object to produce gamma rays. The gamma rays are detected by suitable detectors, such as inorganic scintillators, and in a preferred embodiment, the scintillators are arranged so as to surround the object to provide for detection of a two dimensional slice or plane of the object under observation. A neutron detector may also be used to measure neutron flux in the same vicinity as the gamma ray detectors. The object is moved continuously through the ring of detectors so that successive slices or planes provide for the build up of a three dimensional profile of the nitrogen bearing material within the object under observation. The three dimensional profile may then be used to determine the concentration and distribution of the nitrogen (or other element, or combinations of elements) bearing material and to make a determination whether such nitrogen (or other element) bearing material has a profile likely to be an explosive material, or other contraband, as manifest, e.g., by a high nitrogen, chlorine and/or hydrogen density. This determination is enhanced by correlating the elemental density image thus obtained with an X-ray image of the same object. In one embodiment, the determination is further facilitated through the use of an Artificial Neural System, or equivalent parallel distributed network. Use of an ANS advantageously results in a PD for the system that is increased and/or a PFA of the system that is decreased over that which is achievable using conventional standard decision analysis.

In one embodiment, the inorganic scintillator is sodium iodide, and two oppositely disposed C-ring detectors having their open ends facing each other are used to provide for a complete profile of each slice or plane along all four sides. In addition, the gamma ray detectors may be formed of sets of detectors in rows and columns to increase the detection capability by receiving additional gamma rays produced by the interaction of the thermal neutrons and nitrogen in the cavity. The present invention, therefore, provides for a greater resolution and efficiency in the detection of potentially explosive material and, because this is accomplished in a fast period of time, also provides for an adequate throughput of the luggage or parcels through the detection system.

While the invention herein disclosed has been described by means of specific embodiments and applications thereof, numerous modifications and variations could be made thereto by those skilled in the art without departing from the scope of the invention set forth in the allowed claims. For example, instead of using a TNA-based system to probe or scan the luggage or parcels in order to cause the characteristic gamma rays to be emitted from the materials contained within the luggage or parcels, other equivalent or similar systems could be used. For example, an FNA (fast neutron activation) system could be used. So long as gamma rays or other indicia representative of the composition of the materials within the parcel or luggage are generated, and so long as a suitable detection system or mechanism is used to quantitatively sense the gamma rays or other indicia, an ANS system as described herein may be used to analyze the detected radiation (gamma rays or other indicia) for the purpose of determining whether explosive or other materials are present within the parcel or luggage. Advantageously, the ANS portion of such a detection system may perform its function of discriminating between parcels with and without the materials of interest simply by learning from examples, as opposed to being programmed with complex algorithms based on conventional statistical analysis techniques.

Particular features of the invention are set forth in the claims that follow.

What is claimed is:

1. A method for detecting explosives in an object, such as a suitcase or a parcel, comprising the steps of:
   (a) irradiating a sample object containing a known explosive material with neutrons having an appropriate energy and intensity to penetrate the walls of the object and to be absorbed into the explosive material within the object;
   (b) detecting and recording the number of gamma rays at particular energy levels emitted from the explosive material in the object as a result of the neutron bombardment of step (a);
   (c) presenting data derived from the gamma ray counts obtained from the explosive material to an artificial neural system (ANS) for the purpose of teaching the ANS how to properly classify the known explosive material;
   (d) irradiating at least one object, such as a parcel or a suitcase, containing unknown materials with neutrons of substantially the same energy and concentration as in step (a);
   (e) detecting and recording the number of gamma rays at particular energy levels emitted from the unknown material in the object as a result of the neutron bombardment of step (d); and
   (f) presenting data derived from the gamma ray counts obtained from the unknown material to the ANS for the purpose of having the ANS classify the object as one having or not having an explosive material.

2. The method of claim 1 further including repeating steps (a)–(c) a sufficient number of times to teach the ANS how to properly classify a plurality of known explosive materials.

3. The method of claim 2 wherein the repeating of steps (a)–(c) is automatically carried out under control of a computer.

4. The method of claim 1 wherein steps (c) and (f) comprise presenting the gamma ray counts directly to the ANS.

5. The method of claim 1 wherein steps (c) and (f) comprise developing feature data from the gamma ray counts and presenting the feature data to the ANS.

6. The method of claim 5 wherein the step of developing feature data comprises selectively combining the gamma ray counts.

7. The method of claim 6 wherein the step of selectively combining gamma ray counts includes generating three-dimensional image data of at least one particular element within said object, said three-dimensional image data being based on the detection of gamma rays of a particular energy level associated with said at least one particular element.

8. A method of detecting the presence of a prescribed material in an object, such as a suitcase or a parcel, comprising the steps of:
   (a) teaching an Artificial Neural System (ANS) how to detect the presence of said prescribed material within said object based on a quantitative analysis of particular emissions emitted from said prescribed material when irradiated with radiant energy, said ANS comprising a plurality of layers of processors connected in a parallel network, said teaching including adjusting the interconnections between said processors with an appropriate weighting factor; and
   (b) presenting emissions from said object to the ANS trained in step (a), whereby the ANS detects whether said prescribed material is present within said object.

9. The method of claim 8 wherein the step of teaching said ANS includes the iterative process of:
   (1) presenting the emissions emitted from a first configuration of said prescribed material to an input processor layer of said ANS,
   (2) incrementally adjusting selected weighting factors of said ANS until an output processor layer of said ANS signals the detection of said prescribed material, (3) repeating steps (1) and (2) for additional configurations of said prescribed material, and (4) repeating steps (1) through (3) a sufficient number of times to train the ANS to correctly detect said prescribed material for all tested configurations.

10. A method for non-invasively detecting explosives in an object under investigation comprising the steps of:
(a) generating thermal neutrons;
(b) irradiating said object with said thermal neutrons, the interactions of said thermal neutrons with atomic nuclei within said object giving rise to the emission of gamma rays, said gamma rays having an energy level characteristic of the nuclear species contained in said object;
(c) detecting emitted gamma rays having an energy level characteristic of at least one specific element and the approximate location of the origin of said gamma rays within said object, thereby providing a measure of the density distribution of said at least one specific element within said object;
(d) detecting neutrons that pass through said object without substantially interacting with atomic nuclei, the detection of said neutrons thereby providing a rough measure of the density distribution of most nuclear species within said object;
(e) generating a three-dimensional elemental density image of said object based upon the density distributions obtained from steps (c) and (d); and
(f) determining whether said three-dimensional elemental density image indicates the presence of explosives within said object.

11. The method of detecting explosives as set forth in claim 10 wherein step (c) includes rejecting background noise in the spectrum of detected gamma rays, said background noise including gamma rays that are emitted from non-explosive elements within said object and its surrounding environment.

12. The method of detecting explosives as set forth in claim 11 wherein said means for rejecting background noise includes measuring background noise at a first region in the spectrum of detected gamma rays and subtracting said background noise from a second region in the spectrum of the detected gamma rays, said second region in the gamma ray spectrum corresponding to gamma rays resulting from neutron interaction with nitrogen nuclei.

13. The method of detecting explosives as set forth in claim 10 further including generating at least one two-dimensional electron density image of said object; and using said electron density image in combination with said three-dimensional elemental density image to help confirm the presence of explosives within said object.

14. The method of detecting explosives as set forth in claim 13 wherein the step of generating at least one two-dimensional electron density image of said object comprises generating two two-dimensional electron density images of said object, a first electron density image lying in a first plane, and a second electron density image lying in a second plane that is orthogonal to said first plane, whereby the combination of said first and second electron density images provides three-dimensional electron density information relative to said object.

15. The method of detecting explosives as set forth in claim 13 wherein step (f) includes using an artificial neural system for processing the information obtained form steps (c) and (d) in a parallel distributed network for the purpose of quickly recognizing a pattern of detected gamma rays and neutrons indicative of an explosive.

* * * * *